US008363980B2

(12) United States Patent
Beresford et al.

(10) Patent No.: US 8,363,980 B2
(45) Date of Patent: Jan. 29, 2013

(54) VIDEO PROCESSING SYSTEM AND METHOD

(75) Inventors: Ratna Beresford, Basingstoke (GB); Michael John Williams, Winchester (GB)

(73) Assignee: Sony Corporation, Tokyo (JP)

( * ) Notice: Subject to any disclaimer, the term of this patent is extended or adjusted under 35 U.S.C. 154(b) by 1030 days.

(21) Appl. No.: 12/198,449

(22) Filed: Aug. 26, 2008

(65) Prior Publication Data

US 2009/0067668 A1 Mar. 12, 2009

(30) Foreign Application Priority Data

Sep. 7, 2007 (GB) .................................. 0717460.0

(51) Int. Cl.
*G06K 9/00* (2006.01)
(52) U.S. Cl. ........ 382/293; 382/195; 382/201; 345/427; 345/644; 348/141
(58) Field of Classification Search .......................... None
See application file for complete search history.

(56) References Cited

U.S. PATENT DOCUMENTS

| | | | | |
|---|---|---|---|---|
| 5,706,419 A | * | 1/1998 | Matsugu et al. | 345/420 |
| 5,729,471 A | * | 3/1998 | Jain et al. | 725/131 |
| 5,768,443 A | * | 6/1998 | Michael et al. | 382/294 |
| 2003/0021381 A1 | | 1/2003 | Koppe et al. | |
| 2003/0133589 A1 | * | 7/2003 | Deguillaume et al. | 382/100 |
| 2004/0095385 A1 | * | 5/2004 | Koo et al. | 345/757 |
| 2006/0173357 A1 | * | 8/2006 | Vilsmeier et al. | 600/476 |
| 2009/0066696 A1 | * | 3/2009 | Williams | 345/427 |

* cited by examiner

*Primary Examiner* — John Lee
(74) *Attorney, Agent, or Firm* — Oblon, Spivak, McClelland, Maier & Neustadt, L.L.P.

(57) ABSTRACT

A method of calculating a transform matrix for transforming points in a model of an object to an image of the object captured by a camera. The camera produces a two dimensional view of the object, the object having a plane, which includes a plurality of lines defining features on the plane of the object. The method comprises identifying a plurality of triplets of points on the lines of the object in the image from the camera, each of the triplets of points providing three or more non co-linear points on the lines of the object. The method includes identifying a sample triplet of points in the model, for each of the identified plurality of triplets of points, calculating a transform matrix which will transform the sample triplet from the model onto the identified triplet of points from the camera image, for each of the identified transform matrices, calculating a transform matrix for transforming a plurality of points on the lines of the object from the model to the image, calculating a comparison metric between the points transformed from the lines of the plane of the object in the model and corresponding points in the image view of the object, and identifying the transform matrix which produces the best comparison metric. The identified transform matrix can therefore be used to transform points on the model into the image produced by the camera, or points in the image onto the model.

19 Claims, 9 Drawing Sheets

VIDEO PROCESSING SYSTEM AND METHOD

FIELD OF THE INVENTION

The present invention relates to methods of calculating a transform for transforming points in a model of an object to an image of the object captured by a camera. The present also relates to an image processing apparatus and system for calculating a transform for transforming points in a model of an object to an image view of the object captured by a camera.

Embodiments of the present invention can be used to represent a simulated feature or effect within an image captured by a camera by generating that feature or effect within a model and transposing that feature or effect into the view of the image represented by the model using a calculated transform matrix.

BACKGROUND OF THE INVENTION

It is known to provide an arrangement in which video or television images of a sporting event are embellished by displaying computer generated images within the video images so that for example, these are superimposed on a field of play. For example, advertisements or club emblems of teams which are playing each other in a football match, for example, can be superimposed on an image of the football pitch which is captured by a camera, so that it appears that the players are playing on top of the images of the emblems which are superimposed on the football pitch. In order to achieve an effect wherein a computer generated image is superimposed on an image of a particular sports field, it is known to calibrate an image produced by the camera with respect to a model representing that image.

The term model as used herein will be used to designate a simulated representation of an object, which has a planar surface, such as a field of play from which images of that field of play are to be captured using a camera.

As disclosed in an article entitled "Flexible Calibration by Viewing a Plane from Unknown Orientations" by Zhengyou Zhang published in 1999 in ICCV, volume1, page 666, there is disclosed a method of self-calibration in which, a camera is moved in a static scene, and a rigidity of the scene provides two constraints on the camera's internal parameters from one camera displacement by using image information alone. The self-calibration is in contrast to photo-grammetric calibration in which a calibration object whose geometry in 3-D space is known with very good precision. The article discloses an arrangement for translating points within a model and points within the image so that points within the model can be mapped to the image and vice versa. However, the disclosed technique requires that a pattern be attached to planar surface of the image, which is captured before an estimation of five intrinsic parameters can be generated in order to translate between the model and the image.

Improvements in or relating to a process in which features or effects within a model can be represented within an image in a plane of a field of view such as a sporting field of play represent a technical problem particularly, for example when the translation is performed in real time.

STATEMENT OF INVENTION

According to the present invention there is provided a method of calculating a transform matrix for transforming points in a model of an object to an image of the object captured by a camera. The camera produces a two dimensional view of the object, the object having a plane, which includes a plurality of lines or edges defining features on the plane of the object. The method comprises identifying a plurality of triplets of points on the lines or edges of the object in the image from the camera, each of the triplets of points providing three or more non co-linear points on the lines or edges of the object. The method includes identifying a sample triplet of points in the model, for each of the identified plurality of triplets of points, calculating a transform matrix which will transform the sample triplet from the model onto the identified triplet of points from the camera image, for each of the identified transform matrices, calculating a transform matrix for transforming a plurality of points on the lines or edges of the object from the model to the image, calculating a comparison metric between the points transformed from the lines or edges of the plane of the object in the model and corresponding points in the image view of the object, and identifying the transform matrix which produces the best comparison metric. The identified transform matrix can therefore be used to transform points on the model into the image produced by the camera, or points in the image onto the model.

Thus the identified transform matrix can be used to transform points on the model into the image, which is produced by the camera or points in the image onto the model depending on whether the plurality of triplets are selected in the image or the model and the sample triplet is matched from correspondingly the model or the image. This is because, the transform matrix once determined in one direction from the model to the image or the image to the model can be used to calculate an inverse transform for transforming points in the other direction.

Embodiments of the present invention can provide a technique which automatically calibrates an image captured by a camera with respect to a model of that image by finding an optimised transformation of points within the model plane or the image produced by the camera using lines in a plane of the object, which set out features of the object as seen within the image view produced by the camera.

Once the transform matrix has been calculated, it can used to translate points in the model to points in the image plane of the object. Thus, the transform matrix can be used to transfer a graphical feature, which is created in the model of the object from the plane of the object into the image view, so that special effects, such as embellishments to a football pitch, for example, can be reproduced on a live image of the football pitch. As such, the model of the object is locked to an image of the real object captured by a camera, without manual calibration or a requirement to provide training images. Therefore, in contrast to known techniques, embodiments of the present invention can be arranged to lock a model of an object to an image of the object without a requirement to place training objects within a field of view of the camera, because the transform matrix is generated with reference to lines in a plane of the object, which may be present in the object, such as a football pitch.

In some embodiments, a further refinement of the transformation matrix is effected by selecting a sample triplet of points from the plane of the object from one of the image view from the camera, forming lines between the selected sample triplet of points, and forming a test feature by expanding the thickness of the lines connecting each of the points of the sample triplet to a predetermined number of n-pixels. A corresponding triplet of points in the model is transformed using the identified transform matrix, which has the best comparison metric, to form a transformed feature from lines between the points of the transformed triplet of points. For a predetermined set of one or more adjustments, the points of the transformed triplet of points are then adjusted and correspondingly the lines between the points are adjusted. The comparison metric between the test feature and the adjusted transformed feature is then re-calculated, for each of the predetermined adjustments, and a best comparison metric identified. For the adjustment with the best transform metric, the transform matrix is re-calculated to form a new best transform matrix.

The term triplet as used herein is used to describe at least three points which are non co-linear on identified features such as edges or lines of an object. However it will be appreciated that more points which are used in a triplet than three can required more processing in the calculation of the transform matrix explained below.

Various further aspects and features of the present invention are defined in the appended claims.

BRIEF DESCRIPTION OF DRAWINGS

Embodiments of the present invention will now be described, by way of example with reference to the accompanying drawings where like parts have been designated with like reference numerals and wherein.

DESCRIPTION OF EXAMPLE EMBODIMENTS

Example embodiments of the present invention will now be explained with reference to an example illustration of a sporting event which will be a football match. As such, embodiments of the present invention provide a technique for reproducing a simulated effect or feature such as a map or emblem within the model view and transposing that model view of the graphical feature into a plane of the football pitch within the image view. Furthermore, embodiments of the present invention provide a technique for automatically locking the model view of the football pitch to the image view of the football pitch which is captured by the camera. The image provided by the camera is therefore a two dimensional view of the football pitch. Since the camera is locked to the model view effects such as features of simulated objects and other special effects can be represented within the plane of the model and automatically translated to the plane of the football pitch within the two dimensional image captured by the camera to produce a view of the football pitch within a live video feed which includes that feature.

Figure 1:
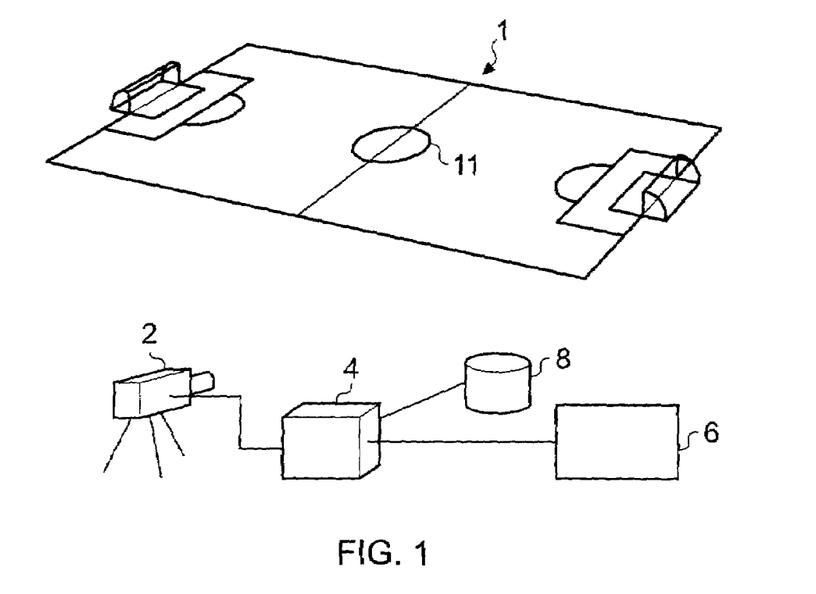
FIG. 1 is a schematic block diagram representing a system for processing images produced by a camera of an example object which is a football pitch.

An example embodiment of the present invention is shown in FIG. 1 in which a football field 1 is captured within a video image produced by a camera 2 and fed to a processing device 4. The processing device 4 may perform all processing required to lock an image view of the football pitch 1 onto a model view of the football pitch so that effects within the model view can be represented within the image view. Thus a live video feed produced by the camera 2 can be fed to the processing unit 4 for processing and representations within the plane of the model can be applied to the live video feed in real time. The video feed can be streamed to an internet gateway 6 or stored within a server 8 for access via the internet and/or other client devices such as mobile communications devices.

Figure 2:
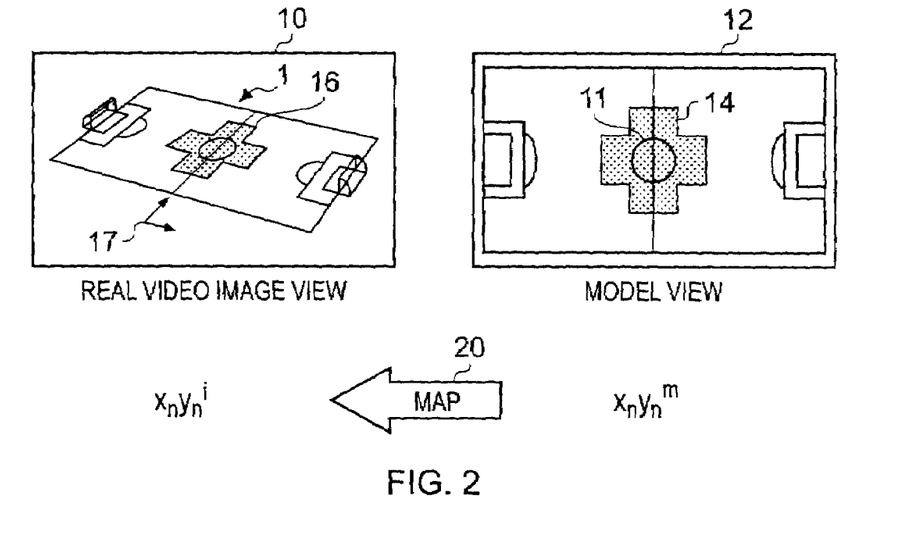
FIG. 2 is an example illustration of a mapping of the football pitch shown within the image captured by the camera and a model view of the football pitch in which a simulated graphical feature is produced within the model view and transposed onto the football pitch within the two dimensional image.

As illustrated in FIG. 2 a view of the football pitch 1 captured by the camera 2 is represented within a left-hand window 10. A model of the football pitch is represented within a model view 12. As illustrated in FIG. 2 a simulated graphical feature 14, for example, a cross shape appearing over a centre circle 11 of the football pitch 1 is generated within the model of the football pitch 12 and reproduced within the image view of the football pitch 10 within a plane of the football pitch, as represented by arrows 17.

Embodiments of the present invention are arranged to reproduce the simulated feature 14, which has been generated within the plane of the model of the football pitch 12, within the image view 10 as correspondingly within the plane of the football pitch so that the simulated feature 14 is shown within a live video feed. As illustrated by an arrow 20, to produce the simulated feature 14 within the model view, a mapping process is performed to map pixel points within the model view 12 into the plane of the football pitch 1 within the image view 10, so that appropriate changes within the image can be performed to represent the shape and characteristics of the feature 14 within the image view 10.

Generally, a process for calculating a transformation of points within the model view into the image view can be performed with respect to the model view or the image view. As will be described shortly, translation is performed from the model view into the image view although it will be appreciated that a transform matrix which allows the translation of the points from the plane of the model to the plane of the image can be calculated with respect to a translation of points from the image view to the model view and that a transformation matrix for translating the plane of the model into the plane of the image view can be calculated mathematically by inverting the transform matrix which transforms points from the model to the image.

A technique according to an example embodiment of the present invention for locking an image view of the object, such as the football pitch, to a model view of that object can be divided generally into two parts. A first part identifies a best estimate of a transform matrix for transforming points in the model to points in the image, whereas the second part provides a process for optimising that transform matrix. FIGS. 3, 4, 5 and 6 explain the first part of the operation, which identifies a best estimate of a transform matrix for transforming points from the model view into the image view.

Figure 3:
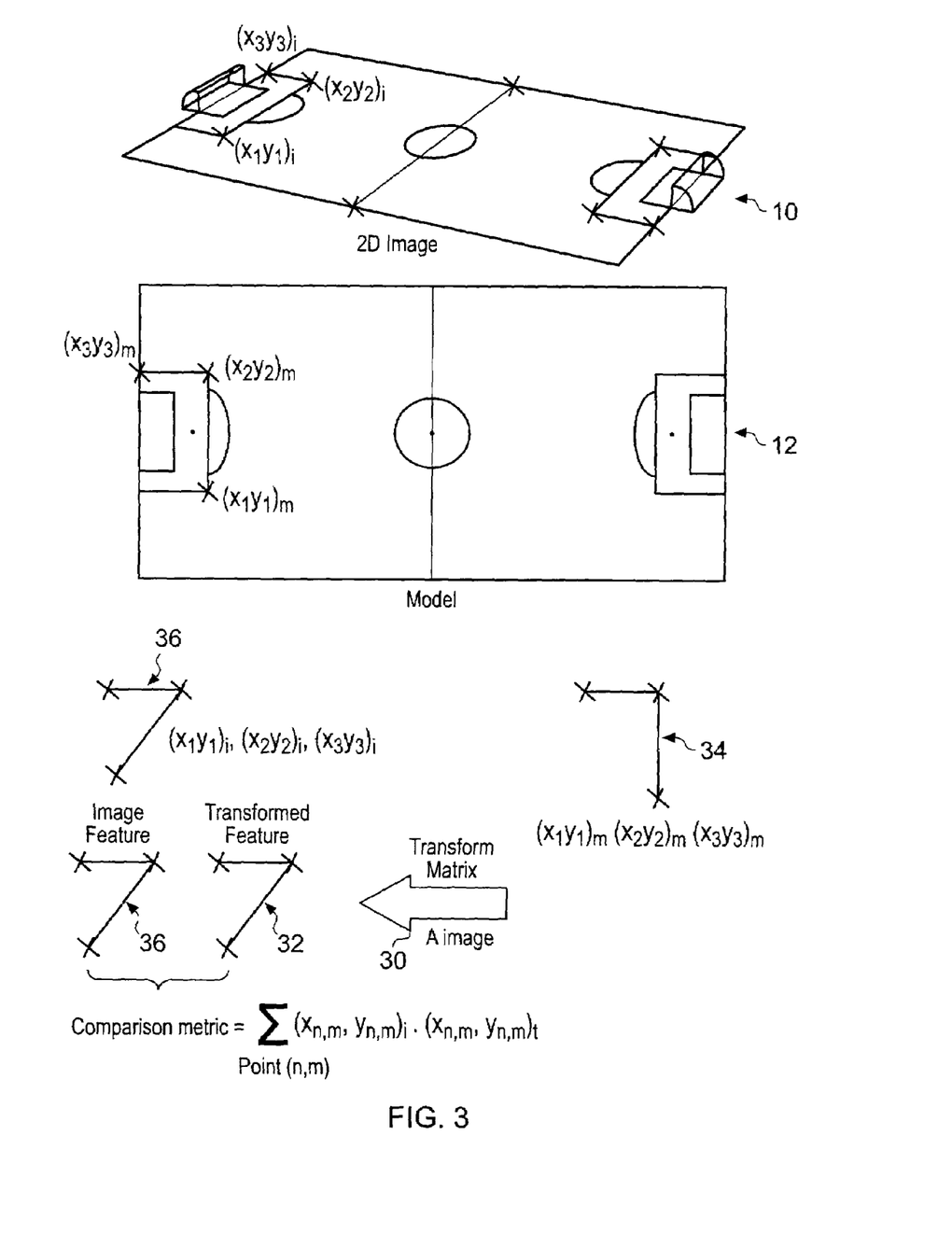
FIG. 3 provides a representation of two illustrative steps required to perform the transformation from the image view of the object into the model view and vice versa.

FIG. 3 provides an example illustration of two mathematical calculations which are required in order to generate a transformation matrix for transforming from the plane of the model to the plane of the image of the football pitch. As shown in FIG. 3, a triplet of three or more points or "triplet" is identified within the image view 10 which comprises points $(x_1y_1)_i, (x_2y_2)_i, (x_3y_3)_i$ that are non co-linear points within the image of the football pitch on the lines marking the features of the football pitch. Thus, the triplet shown in FIG. 3 within the image view 10 is that of three points within the left hand side penalty area of the football pitch 1. A triplet corresponding to that selected triplet is shown within the model view 12 as points $(x_1y_1)_m, (x_2y_2)_m, (x_3y_3)_m$.

As shown in the lower half of FIG. 3 by a transform matrix illustrated by an arrow 30, embodiments of the present invention provide an arrangement in which the triplet from the model can be transformed into the corresponding triplet within the image using a transform matrix, which is calculated in accordance with the present technique as identified below:

For the image triplet, a matrix A is computed that maps the unit triplet of points ((0 0), (1 0), (0 1)) to a triplet of points with corners $((x_1y_1)_i, (x_2y_2)_i, (x_3y_3)_i)$. As indicated above, the image triplet must contain three distinct and non-collinear points. A is a 3-by-3 matrix.

$$A_{image} = \begin{bmatrix} x_2 - x_1 & y_2 - y_1 & 0; & \dots \\ x_3 - x_1 & y_3 - y_1 & 0; & \dots \\ x_1 & y_1 & 1 \end{bmatrix};$$

Correspondingly, a matrix $A_{model}$ is formed for the corresponding triplet of points $(x_1y_1)_m, (x_2y_2)_m, (x_3y_3)_m$ from the model:

$$A_{model} = \begin{bmatrix} x_2 - x_1 & y_2 - y_1 & 0; & \dots \\ x_3 - x_1 & y_3 - y_1 & 0; & \dots \\ x_1 & y_1 & 1 \end{bmatrix};$$

The transform that can be used to transform all the points of the model to the corresponding points in the image view is:

$$A = (A_{model})^{-1} * A_{image};$$

In order to determine whether the transform matrix is accurate, a comparison metric is calculated for comparing a triplet of points 32 produced by transforming a triplet of points 34 from the model using a calculated transform matrix to an image 30, with the corresponding triplet from the actual image 36. As will be explained shortly and as illustrated in FIG. 3, the comparison metric is calculated by converting the lines of the image of the football pitch into 1's where a line is present as a pixel and zero where a line is not present and summing a total number of points. Thus for all pixels between a feature with lines between the transformed triplet 32 and pixels extracted from lines connecting the image triplet of points 36 where pixels contain lines within both the transform feature and the image feature. As a result a metric is produced which provides a representation of how close the transformed feature 32 is to the image feature 36. However, as will be appreciated this is just one example of a comparison metric and other comparison metrics could be used.

Figure 4:
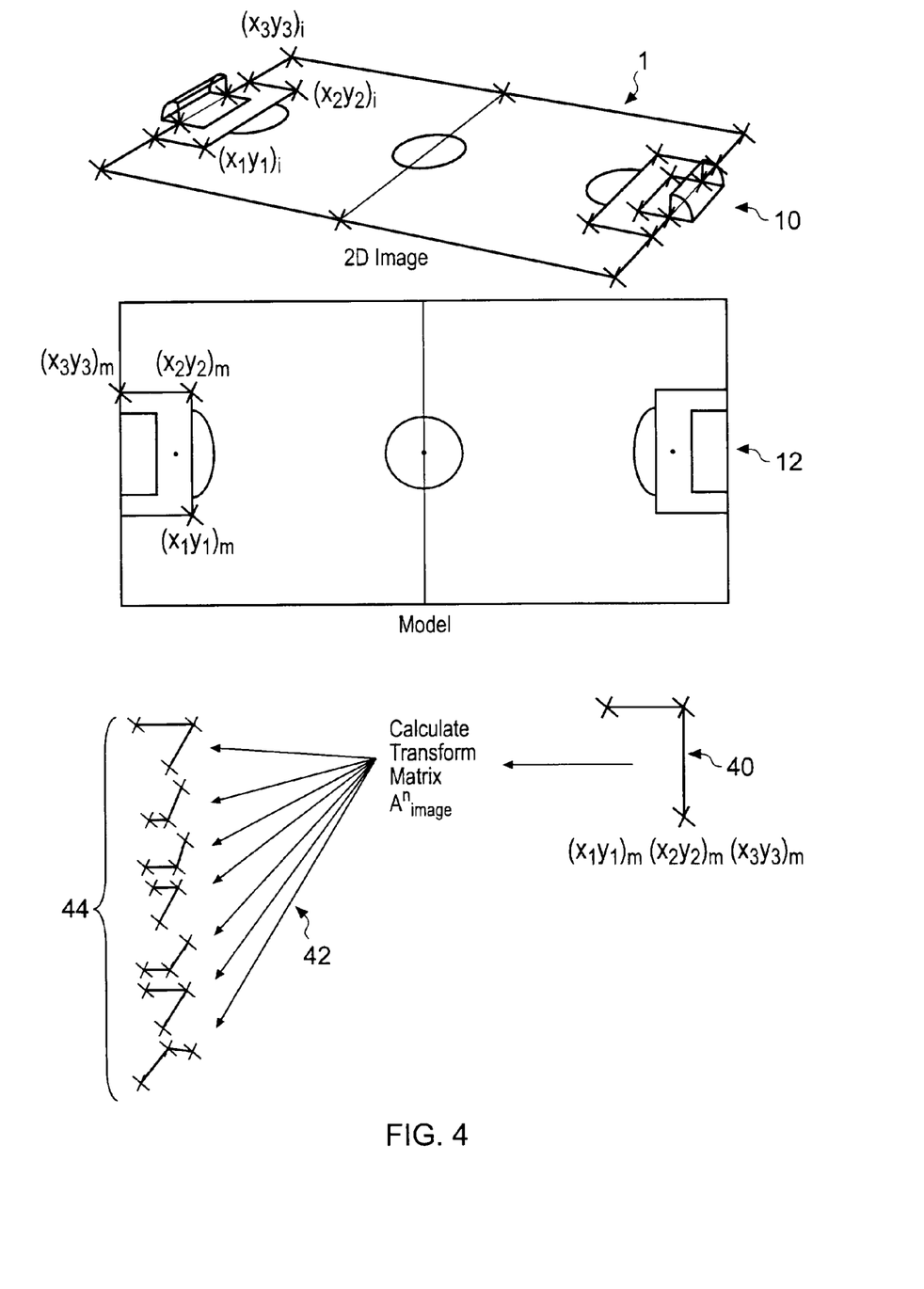
FIG. 4 is a representation of a process for calculating a first transform matrix for transforming points within the model to points within the image plane.
Figure 5:
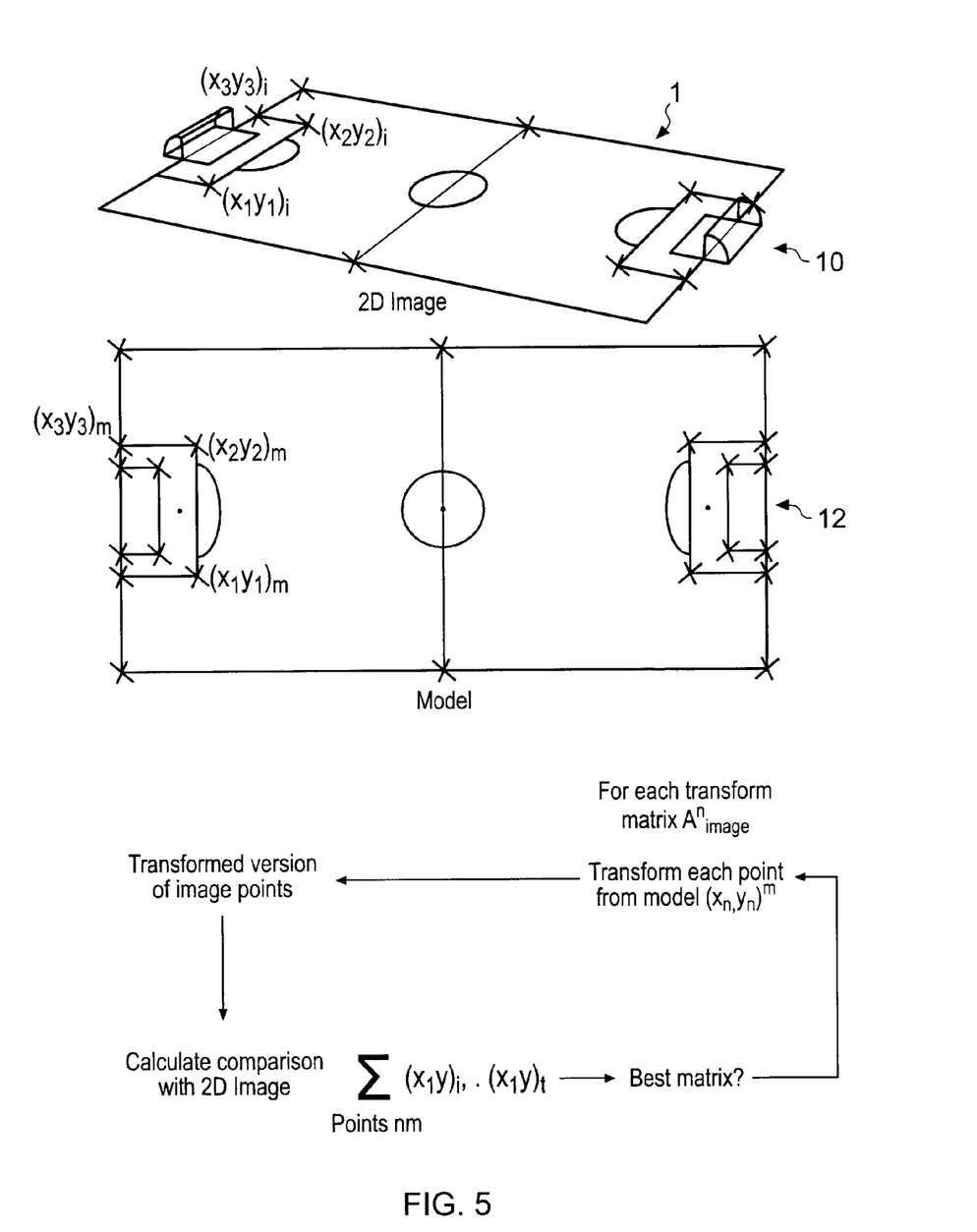
FIG. 5 is an illustration of a second part of identifying a best transform matrix for transforming points within the model to points within the image plane.

FIG. 4 provides a corresponding representation of the image of the football pitch produced by the camera 10 and the model view of the football pitch 12, in which all possible triplets have been identified within the image view of the pitch 1. However, as shown within the model view 12 only a single triplet 40 is extracted for processing. As a first step in a process of calculating a transform matrix for points within the model plane to points within the image plane, the triplet of points 40, which will form a sample triplet is compared with all possible triplets from the image view 10 produced by the camera and as illustrated by arrows 42 a transform matrix is calculated for transforming the sample triplet 40 into each of the triplets 44 which have been extracted from the image view 10. As illustrated in FIG. 5 for each transform matrix produced for transforming the sample triplet 40 from the model onto each of the triplets within the image view 44, points from the model 12 shown in FIG. 5 are transformed to points within the image to produce a corresponding representation within the two-dimensional image view as seen by the camera. The transformed points from the model are used to create a transformed feature by transforming all points connecting lines between the transformed points. The transformed feature is then compared to an image feature formed from pixels along lines connected the image triplet, as viewed by the camera and a comparison metric calculated to compare the transformed view of the pitch with the actual image view of the pitch. As a result of this process, a best transform matrix is identified, which would therefore correspond to finding the best transformation of points within the model view plane to the image view plane of the football pitch.

Figure 6:
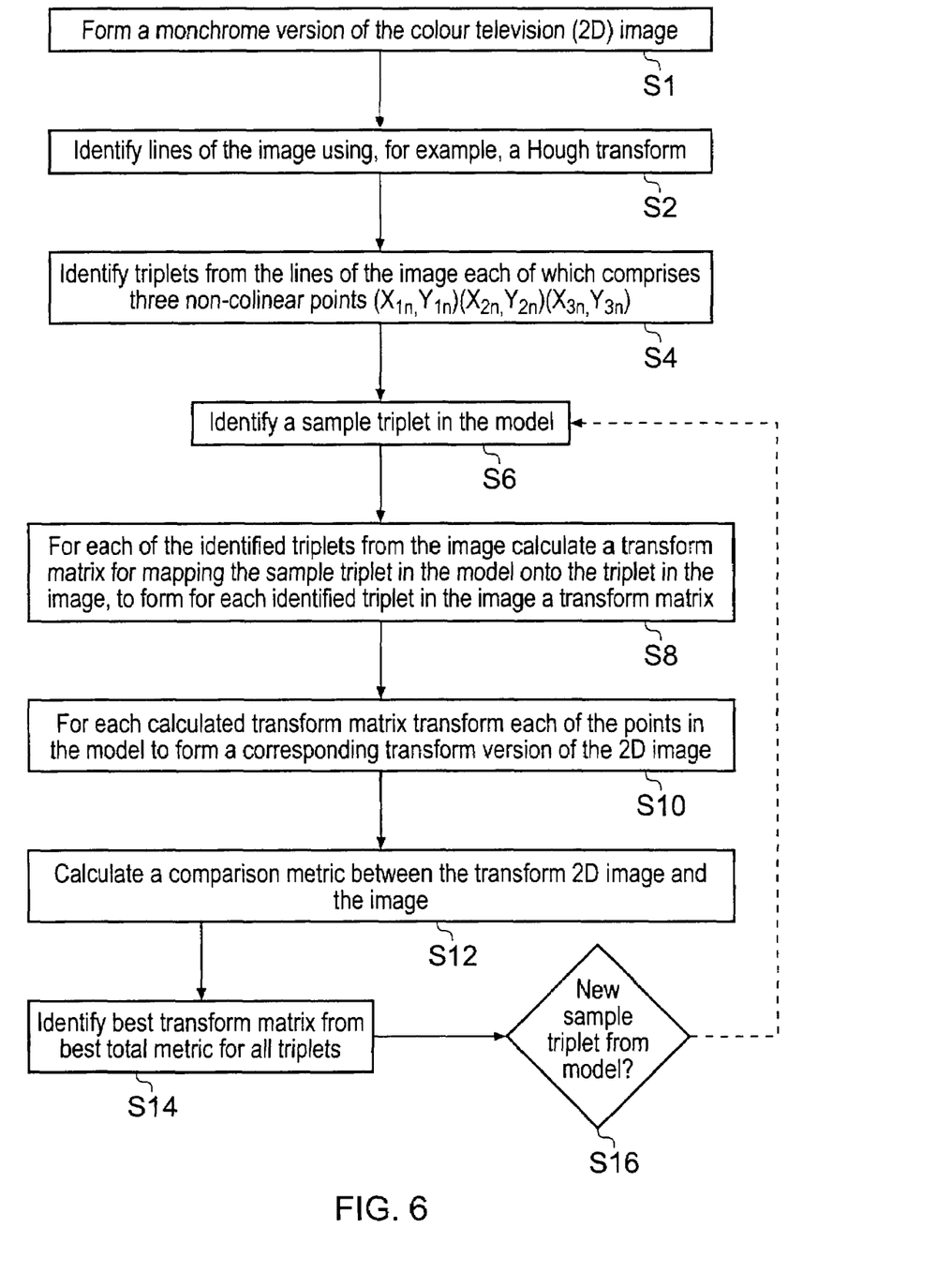
FIG. 6 is an example flow diagram illustrating a process for identifying a transform matrix for transforming points within the model plane into the image plane.

FIG. 6 provides an example flow diagram of process steps which are required in order to produce a first best guess transform matrix for transforming points within the plane of the model to the plane of the football pitch. Each of the steps represented in FIG. 6 is summarised as follows:

S1—the image of the football pitch is converted into a monochrome version of a colour television of the two-dimensional image.

S2—from the monochrome image, lines or edges of the football pitch are identified using, for example, a Hough transform or a similar transform which illustrates the presence of lines within the image.

S4—from the identified lines within the image which are representative of the markings of the football pitch, triplets are identified from the lines of the image, each of which comprises three non co-linear points $((x_{1n}y_{1n})_i, (x_{2n}y_{2n})_i, (x_{3n}y_{3n})_i)$.

S6—a sample triplet is then identified from the model which is to be used to effectively match that sample triplet from the model to the corresponding triplet of points in the image, when formed into a feature with pixels along lines connecting the triplet of points for both the sample triplet and the image triplet.

S8—for each of the plurality of identified triplets from the image view of the pitch, a transform matrix is calculated for mapping the sample triplet in the model onto the triplet in the image to form for each identified triplet in the image a transform matrix. Thus, a plurality of transform matrixes are formed, one for each identified triplet in the image view of the pitch.

S10—for each calculated transform matrix each of the points within the model view of the football pitch is transformed using that transform matrix to form a corresponding transform version of the two-dimensional image.

S12—the transformed version of the model pitch is then compared to the image view of the pitch within the two dimensional view produced by the camera. If the lines of the image and the transformed model are represented as one and the space between the lines (usually green grass) is represented as zero then as illustrated in FIG. 3, the comparison metric is formed where the lines from the transformed pitch are equal to the lines from the image view.

S14—from the comparison metrics for each transformed triplet, a best transform matrix is identified which can be used for translating all of the points within the model plane into the plane of the image view of the football pitch.

S16—optionally it is possible that the sample triplets selected from the model may not exist within the image plane. As such, if a best transform matrix is not identified, for example, where a difference between the best transform matrix and the next best is not significant (the difference is below a pre-determined threshold), then a new sample triplet is selected from the model and steps S8 to S14 are repeated again to identify a transform matrix which represents a best guess of the transformation from the plane of the model to the plane of the image.

Figure 7:
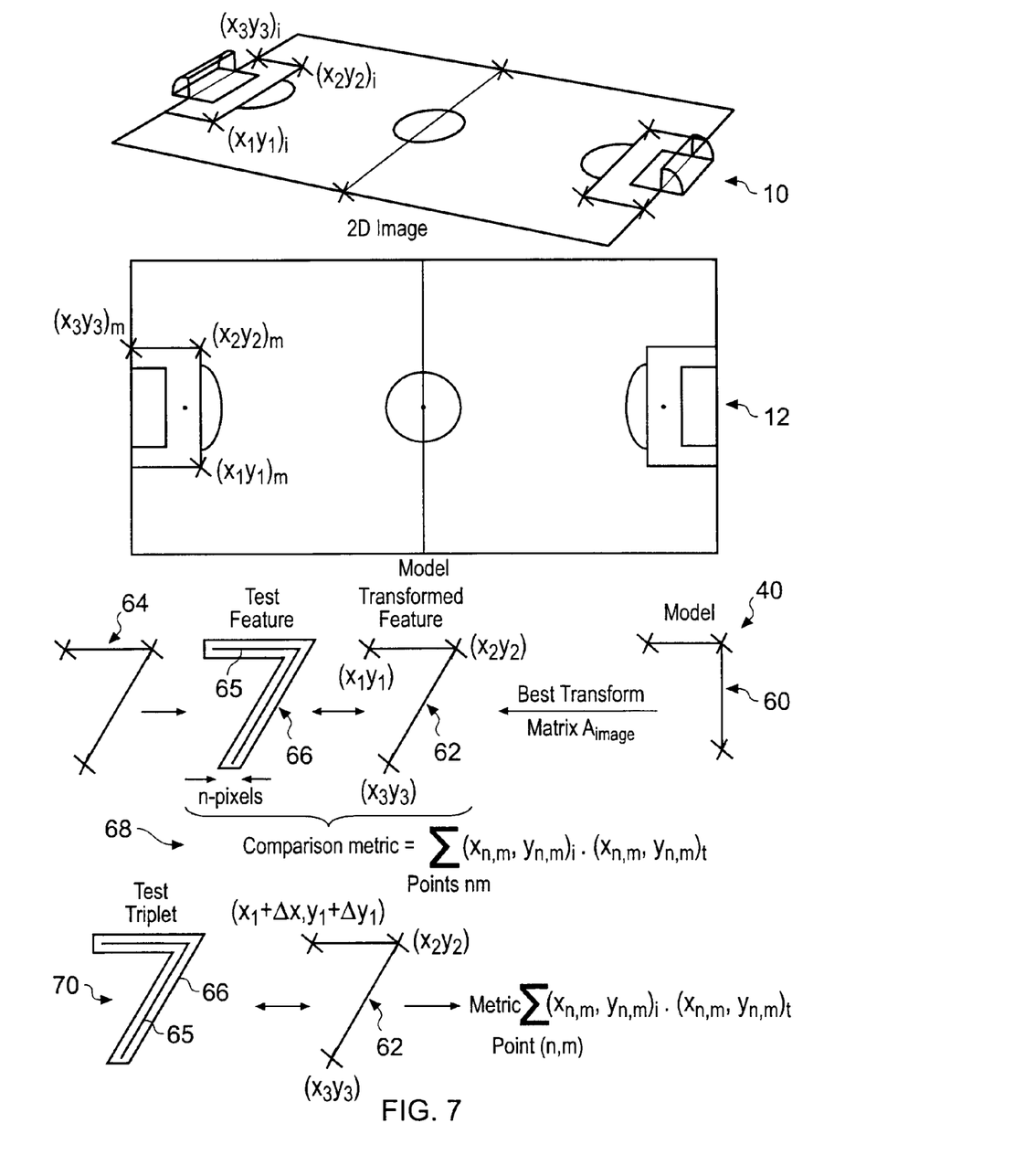
FIG. 7 is a representation of a refinement process for refining the transform matrix from the model plane to the image plane.
Figure 8:
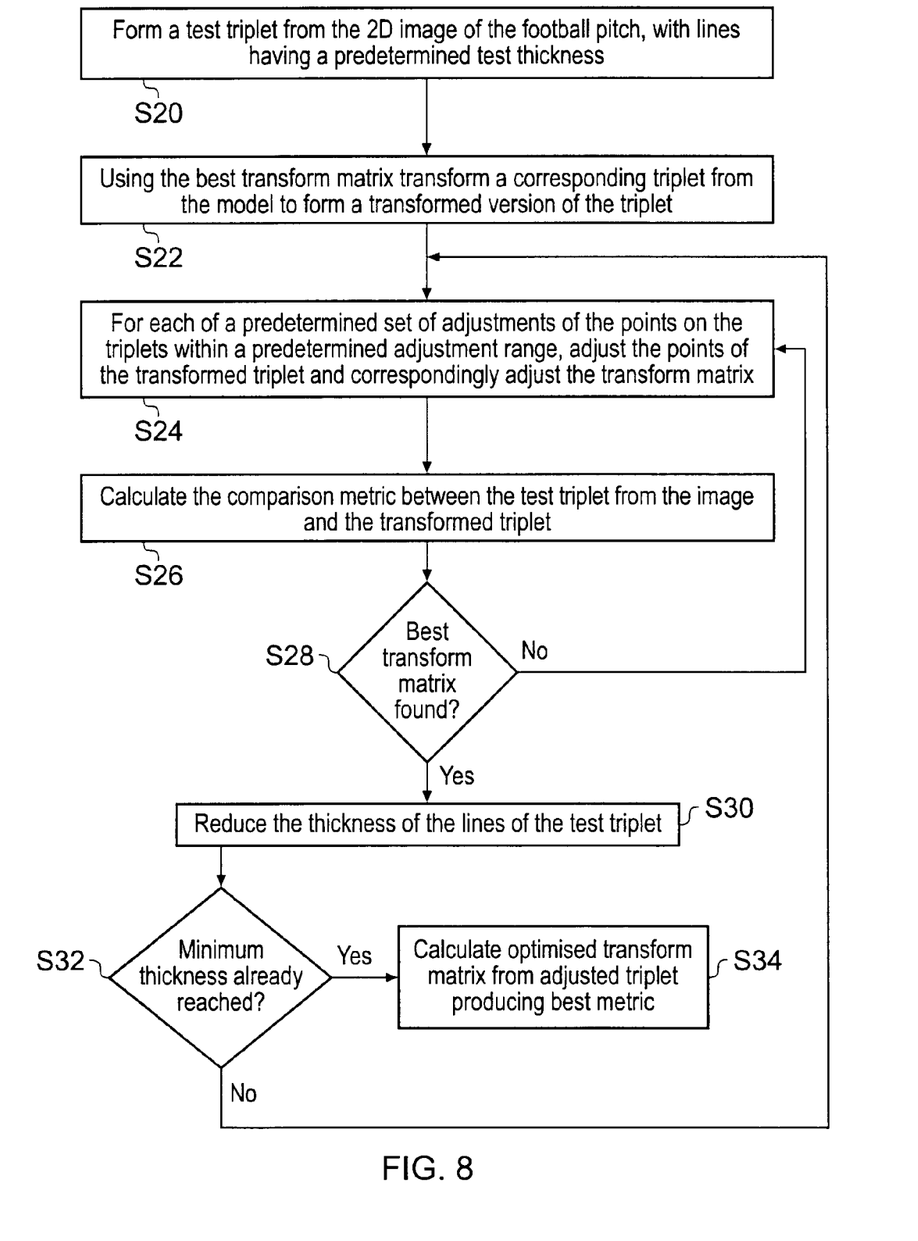
FIG. 8 is an example flow diagram illustrating a process for refining the calculated transform matrix for transforming points within the model to the image.

After identifying a best guess of the transform matrix for transforming points in the model plane to the image plane, FIGS. 7 and 8 illustrate a process for optimising the transform matrix to improve the accuracy of the translation of points within the plane of the football pitch within the model to the plane of the football pitch within the two dimensional image 12, 10.

As shown in FIG. 7, a process of optimising the transform matrix is illustrated pictorially from a first line of process steps 60. As shown in FIG. 7 the triplet from the model 40 which was used to identify the best transform matrix is used to transform the model triplet into a transformed triplet 62 and pixels along lines formed between the points are used to form a transformed feature 62. An image triplet 64 corresponding to the model sample triplet 40 has been identified during the generation of the transform matrix illustrated in the first step of generating the transform matrix. The corresponding triplet can be found by simply using the best transform matrix calculated above, to transform the triplet of points in the model to a triplet of points in the image and extracting image pixels along lines between the transformed points.

The corresponding triplet from the image is then expanded to the effect that the lines of the test feature instead of being one pixel wide are expanded to be N pixels wide where N is an integer number. Thus, as shown in FIG. 7, an expanded test feature 66 is produced, which includes all corresponding image pixels from the camera view, which may include the real lines 65 from the image. The expansion by N pixels therefore increases an amount of the image, which appears in the test feature 66.

As shown in a second line 68 in FIG. 7 a comparison metric is calculated between the transformed feature 62 and the test feature 66 in a corresponding way to that described above noting however, that since the test feature has been expanded in width by N pixels of the image, then it is more likely to produce a contribution which adds to the metric, because the expanded feature is more likely to include the lines of the football pitch 65.

As illustrated by the third line 70 in FIG. 7 each of the points $((x_{1n}y_{1n})_i, (x_{2n}y_{2n})_i, (x_{3n}y_{3n})_i)$ is in turn shifted by a sub-pixel amount $(\delta x, \delta y)$ one at a time and the metric recalculated until after cycling through a predetermined number of shifts of each of the points of the triplet of the image a best metric is identified. The shifting of the points can be represented as follows:

---

For each of $((x_{1n}y_{1n})_i, (x_{2n}y_{2n})_i, (x_{3n}y_{3n})_i)$,
    for each of u = 1 to K
        form $((x_{1n} +\delta x \times u, y_{1n} +\delta y \times u)_i, (x_{2n}y_{2n})_i, (x_{3n}y_{3n})_i)$;
        form transformed feature;
        calculate comparison metric with test feature;
        form $((x_{1n}y_{1n})_i, (x_{2n} +\delta x \times u, y_{2n} +\delta y \times u)_i, (x_{3n}y_{3n})_i)$;
        form transformed feature;
        calculate comparison metric with test feature;
        form $((x_{1n}y_{1n})_i, (x_{2n}y_{2n})_i, (x_{3n} +\delta x \times u, y_{3n} +\delta y \times u)_i)$;
        form transformed feature;
        calculate comparison metric with test feature;
    end
end

---

Since a shift of the transformed feature with respect to an original version of the transformed feature 64 is known, a corresponding adjustment in the transform matrix can be determined in order to optimise the transform matrix.

Having performed an optimisation of the transform matrix with respect to the test feature, which is N pixels wide, then the width of the test feature is reduced by one pixel and the optimisation of the transform matrix is repeated. That is, the image pixels are reduced by one pixel, reducing the view of the viewed lines 65. Iteratively, this process is repeated with the width of the test feature being reduced by one until the test feature is only one pixel wide. At this point, the optimisation process has been completed and the process terminates with the optimised transform matrix.

In other embodiments, a further test triplet can be selected, similar to the test feature 64 as shown in FIG. 7 and a test feature formed. Optimisation of the transform matrix with respect to that triplet can then be repeated to produce a further refinement in the transform matrix.

FIG. 8 provides an illustrative process for the refinement of the transform triplet as represented in FIG. 7. The steps of the flow diagram as shown in FIG. 8 are summarised as follows:

S20—a test triplet is formed by extracting a triplet identifying two intersecting lines within the 2D image view of the football pitch. The lines are then expanded to N pixels to have a predetermined test thickness to form a test feature of pixels extracted from the image.

S22—using the best transform matrix identified from the previous process, a triplet from the model corresponding to the test triplet is transformed to form a transform version of the triplet of lines connecting the transformed triplet are introduced to form a transformed feature.

S24—for each of the predetermined set of adjustments of the points of the triplets within a predetermined adjustment range, the points of the transformed triplet are adjusted by a sub-pixel amount and the transformed feature correspondingly adjusted.

S26—a comparison metric is then calculated representing a comparison between the test feature from the image and the transformed feature.

S28—has the best comparison metric and correspondingly the best transform matrix been found as a result of all possible shifts within a predetermined range of each of the points of the transform triplet? If not, then the process loops back to step S24 and further shift of the points of the transform triplet is performed. If the best shift of the transform triplet has been found which produces the best comparison metric with respect to the test triplet with an adjusted line thickness, then processing proceeds to step S30.

S30—the thickness of the lines of the test feature are reduced by one pixel in order to repeat the optimisation process according to steps S24 to S28.

S32—has the minimum thickness of one pixel already been reached? If no, then processing loops back to the start of step S24 and steps S24 to S28 and S30 are repeated to further refine the transform matrix. If the minimum thickness of one pixel has been reached, the processing passes to step S34.

S34—an optimised transform matrix is calculated for the shift of the transformed feature producing the best comparison metric.

At this point a refinement of the transform matrix has been produced, which can be used to transform points within the model to points within the image view.

Figure 9:
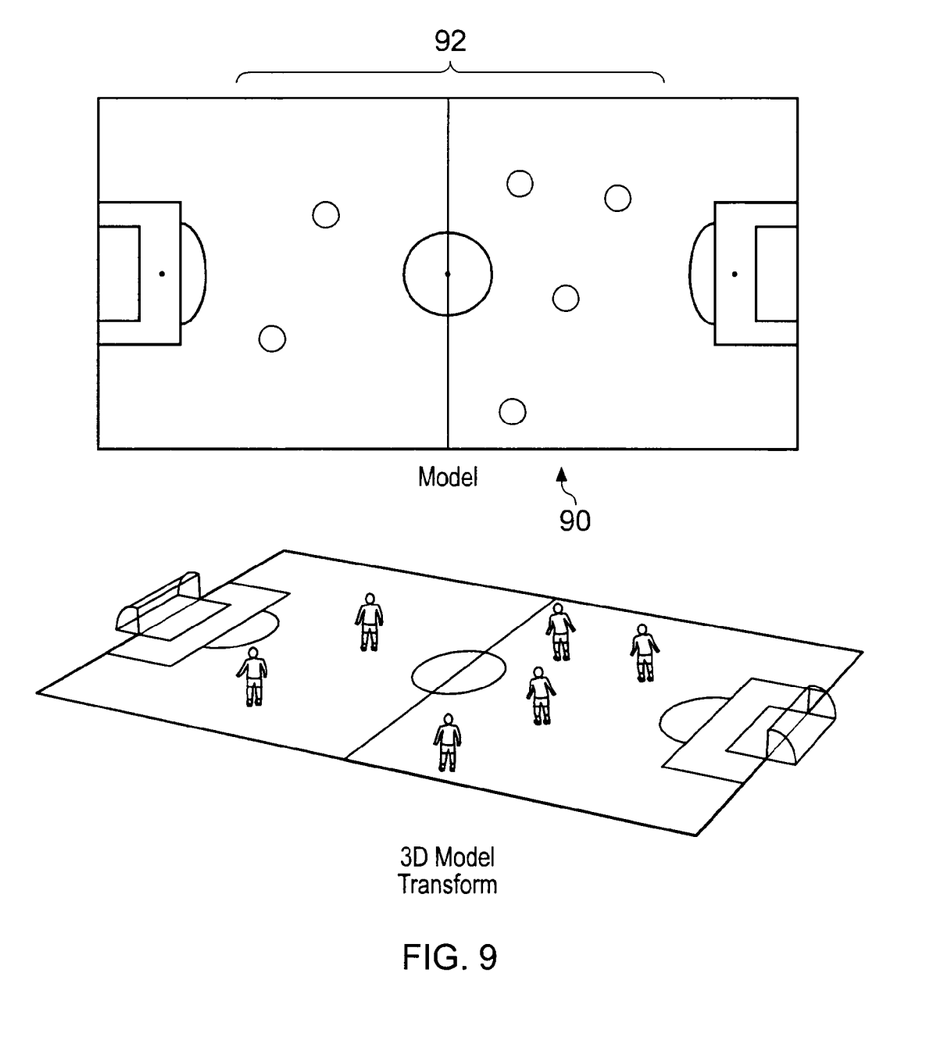
FIG. 9 is an illustration of an example application of the refined transform matrix for transforming 3D models within the model plane onto the two-dimensional image view produced by a camera.

Other example embodiments of the present invention are illustrated with respect to FIG. 9. As represented above a transform matrix is calculated for translating points within a 2D plane formed by the football pitch between a model view of that football pitch to an image view of the football pitch. However, correspondingly a three dimensional translation can be performed from the model view of the pitch into a simulated version of the image view of the pitch. As illustrated in FIG. 9, a model view 90 could include a plurality of simulated players 92 within a plane of the model football pitch. However, if each of these players 92 are provided with a height then the players become 3D objects which can be translated from the model view into the image view for super position on the image view. Moreover, a 2D image view of the pitch can be completely constructed by transforming the model view into the image view as it would be seen by camera. Furthermore, in the image view can be translated by translating between the model view and the image view which can have an effect of shifting the position of the camera in space to adopt different views of the football pitch within the simulated image view. Thus, a virtual representation can be made of the image of the football pitch by making a corresponding an appropriate translations from the model view into the image view. A mathematical representation of the translation of the 3D objects from the model view to the image view is provided using known techniques, such as that explained in the appendix of the above referenced paper entitled "Flexible Calibration by Viewing a Plane from Unknown Orientations" by Zhengyou Zhang published in 1999 in ICCV, volume 1, page 666.

Tracking to Overlaid on Live Video

According to the present technique tracking information, which is generated with respect to a 3D model of a 2D image of a football match as described above, can be added to the video images captured by a video camera. Once a relative position of the players have been identified with a relatively high probability then the position of that player within the 2D video image of the camera is known. Accordingly, a graphic illustrating an identity of that player, as estimated by the tracking algorithm, can be overlaid on to the live video feed from the camera by the content processing workstation 4. Thus, as shown in FIG. 10, each of the players 300, 302, 304, 306 is provided with a corresponding label 308, 310, 312, 314 which is then used to follow that player around the pitch in order to track the identity of that player.

Figure 10:
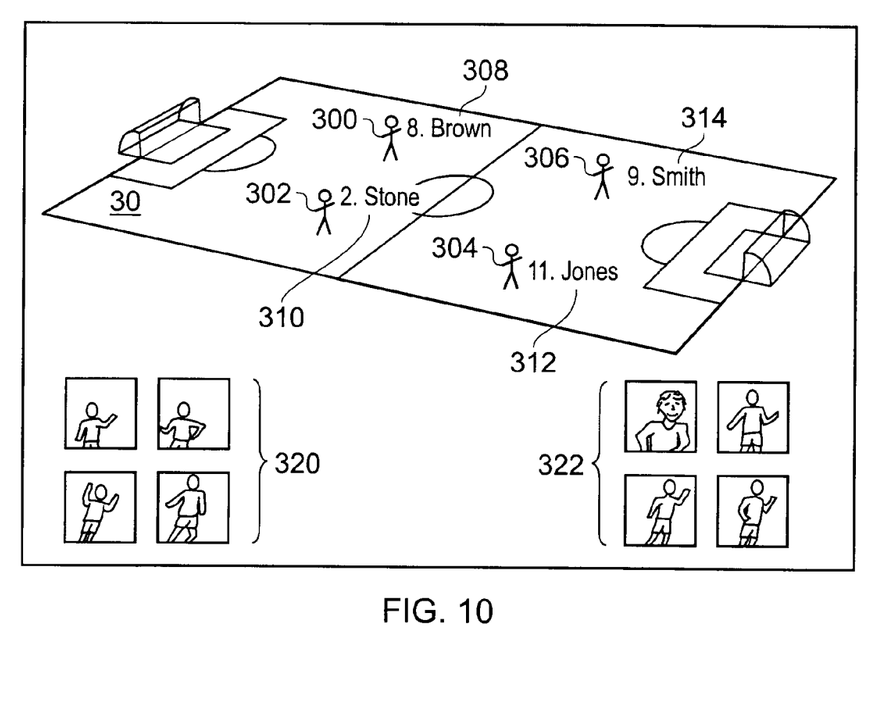
FIG. 10 is a representation of a video image of a football match in which portions of the image have been isolated to track the players and in which a graphical feature has been added.

Also shown within an image view shown in FIG. 10 are two sets of extracted images 320, 322. Each of the sides on the football pitch is provided with one of the sets of extracted images 320, 322. Each image is an isolated section of the image provided from the camera 20, which aims as far as possible to isolate that player on the football pitch. Thus, having identified each of the players, then the image of that player within the video image can be extracted and displayed with other players within each of the sets corresponding to each of the teams on the football pitch. This presentation of the extracted images can provide an automatic isolation of a view of a particular player without a requirement for a separate camera to track that player throughout the football match. Thus, with a single camera provided that camera can see the entire football pitch, then each of the players can be tracked throughout the match.

If a graphic feature or effect is introduced into the video image by matching that feature or effect from the model of the football pitch into the real image, for example, within the plane of the pitch as described above, then the extracted images within each of the sets 320, 322 should also include that portion of the image. This can be done in one of two ways. If the camera is moving then the position of the camera in each frame must be locked to the model calculating a transform matrix from a model to the image for each image frame. Having determined a position of the player which is to be extracted from the image, then the relative portion of the graphic feature or effect can then be mapped from the model into the portion of the image, which is to be used to isolate the particular player to form the sets of images 320, 322.

As an alternative, the graphic feature or effect can be introduced into a high definition version of the video image of the football pitch and a section of that image simply cut out from the version of the image which includes the graphic image feature or effect.

Various modifications can be made to the examples herein before described within departing from the scope of the present invention as defined in the appended claims. For example, although example embodiments have been described with reference to a football pitch, other example applications can be utilised in which a view of a scene including a planar area can be viewed by a camera and correspondingly formed into a model. As will be appreciated, mathematically the translation from the model to the image can be converted from a translation from the image to the model and therefore the translation can be calculated from the image to the model first and then the corresponding translation from the model to the image calculated therefrom.

The invention claimed is:

1. A method comprising:
   calculating a transform matrix for transforming points in a model of an object to an image of the object captured by a camera, the image providing a two dimensional view of the object, the object having a plane, which includes a plurality of lines or edges defining features on the plane of the object, the calculating the transform matrix comprising:
   identifying a plurality of triplets of points on the lines or edges of the object in the image from the camera, each of the triplets providing three or more non co-linear points on the lines of the object in the plane of the object,
   identifying a sample triplet of points in the model,
   for each of the identified plurality of triplets, calculating a transform matrix which will transform the sample triplet from the model onto the identified triplet from the camera image,
   for each of the identified transform matrices, calculating a transformation of a plurality of points on the lines of the object in the model,
   calculating a comparison metric between lines formed between the triplet of points transformed from the lines of the object in the model and corresponding lines between the triplet of points in the image view of the object, the comparison metric indicating a degree of similarity between the transformed triplet of points and the triplet of points in the image, and
   identifying the transform matrix which produces the best comparison metric, the identified transform matrix being for use in transforming points on the model into the image produced by the camera, or points in the image onto the model.

2. The method as claimed in claim 1, wherein the calculating the transform matrix further comprises:
selecting a sample triplet of points from the plane of the object in the image view from the camera,
forming lines between the selected sample triplet of points,
forming a test feature by expanding the thickness of the lines connecting each of the points of the sample triplet by a predetermined number of n-pixels, the test feature including pixels from the image so that the expanded test feature provides an expanded window view of pixels in the image connecting the sample triplet,
identifying the corresponding triplet of points in the model,
transforming the identified corresponding triplet of points using the identified transform matrix, which has the best comparison metric,
forming a transformed feature from lines between the points of the transformed triplet,
calculating a comparison metric between the transformed feature from the model and the test feature,
for a predetermined set of one or more adjustments, adjusting the position of the points of transformed triplet from the model and correspondingly the lines between the points,
re-calculating the comparison metric between the test feature and the adjusted transformed triplet, for each of the predetermined adjustments, and
identifying the best comparison metric, for the adjustments, and for the adjustment with the best transform metric, re-calculating the transform matrix to form a new best transform matrix.

3. The method as claimed in claim 2, wherein the calculating the transform matrix further comprises:
for each of predetermined reductions in the thickness of the lines connecting each of the points of the triplet from n-pixels, repeating for the predetermined set of adjustments, the adjusting of the position of the points of transformed triplet from the model and correspondingly the lines between the points,
the re-calculating of the comparison metric between the test feature and the adjusted transformed triplet, and
the identifying the best comparison metric, for the adjustments, and for the adjustment with the best transform metric, the re-calculating the transform matrix to form the new best transform matrix.

4. The method as claimed in claim 2, wherein the identifying the corresponding triplet of points in the model, which correspond to a triplet of points of the test feature, comprises forming an inverse of the transform matrix and transforming the triplet of points of the test feature into the model using the inverse transform matrix to produce the corresponding triplet of points.

5. The method as claimed in claim 1, wherein the calculating the comparison metric comprises:
comparing each of the pixels on the line connecting the triplet of points on one of the image feature or the transformed feature from the model with the corresponding pixel on the other of the image feature or the transformed feature from the model, and if each of the pixels have the same colour adding one to an accumulated score, and forming the comparison metric from the accumulated score.

6. The method as claimed in claim 1, wherein the calculating the transform matrix further comprises:
forming for the image triplet, matrix $A_{image}$ which maps a unit triplet of points to a triplet of points from the image,
forming, correspondingly, a matrix $A_{model}$ which maps a unit triplet of points to a triplet of points from the model, and
calculating the transform matrix for transforming points of the model to corresponding points in the image view according to $$A = (A_{model})^{-1} * A_{image}.$$

7. The method as claimed in claim 1, wherein the transform matrix is determined by
identifying a plurality of triplets of points on the lines of the model,
identifying a sample triplet of points from the lines on the image view of the object,
for each of the identified plurality of triplets, calculating a transform matrix which will transform the sample triplet from the image onto the identified triplet from model,
for each of the identified transform matrices, calculating a transformation of a plurality of points on the lines of the image view of the object,
calculating a comparison metric between lines formed between the triplet of points transformed from the lines of the object in the image and corresponding lines between the triplet of points in the model,
identifying the transform matrix which produces the best comparison metric,
calculating an inverse of the identified transform matrix, to form the transform matrix for transforming the points in the model to points in the image view of the object.

8. A method as claimed in claim 1, wherein the calculating the transform matrix further comprises:
identifying the lines of the image view of the object, by forming an monochrome version of the image view of the object,
forming a Hough transform of the image, and
identifying the position of the lines from the value of the Hough transform in a two dimensional plane formed by the image view.

9. A method comprising:
introducing a graphical feature into an image view of an object from a video image of the object produced by a camera, the object having a plane, which includes a plurality of lines defining features on the plane of the object, the introducing the graphical feature comprising:
forming a model view of the object,
calculating a transform matrix for transforming points in the plane of the object into the image view of the object by
identifying a plurality of triplets of points on the lines or edges of the object in the image from the camera, each of the triplets providing three or more non co-linear points on the lines of the object in the plane of the object,
identifying a sample triplet of points in the model,
for each of the identified plurality of triplets, calculating a transform matrix which will transform the sample triplet from the model onto the identified triplet from the camera image,
for each of the identified transform matrices, calculating a transformation of a plurality of points on the lines of the object in the model,
calculating a comparison metric between lines formed between the triplet of points transformed from the lines of the object in the model and corresponding lines between the triplet of points in the image view of the object, the comparison metric indicating a degree of similarity between the transformed triplet of points and the triplet of points in the image, and identifying the transform matrix which produces the best comparison metric, the identified transform matrix being for use in transforming points on the model into the image produced by the camera, or points in the image onto the model, and forming the graphical feature in the model of the object, transforming the graphical feature from the model to the image view of the object using the transform matrix, and representing the transformed graphical feature in the image view of the object.

10. A method comprising:

introducing a graphical feature into a section of an image view of an object from a video image of the object produced by a camera, the object having a plane, which includes a plurality of lines defining features on the plane of the object, the introducing the graphical feature comprising:

forming a model view of the object, extracting a portion of the image view provided by the camera, calculating the transform matrix for transforming points in an area of the plane of the object corresponding to the extracted portion into the extracted portion of the image view of the object by:

identifying a plurality of triplets of points on the lines or edges of the object in the image from the camera, each of the triplets providing three or more non co-linear points on the lines of the object in the plane of the object, identifying a sample triplet of points in the model, for each of the identified plurality of triplets, calculating a transform matrix which will transform the sample triplet from the model onto the identified triplet from the camera image, for each of the identified transform matrices, calculating a transformation of a plurality of points on the lines of the object in the model, calculating a comparison metric between lines formed between the triplet of points transformed from the lines of the object in the model and corresponding lines between the triplet of points in the image view of the object, the comparison metric indicating a degree of similarity between the transformed triplet of points and the triplet of points in the image, and identifying the transform matrix which produces the best comparison metric, the identified transform matrix being for use in transforming points on the model into the image produced by the camera, or points in the image onto the model, and forming the graphical feature in the model of the object, transforming a portion of the graphical feature within the area of the plane of the object corresponding to the extracted portion into extracted portion of the image using the transform matrix, and representing the transformed graphical feature in the extracted portion of the image view of the object.

11. An image processing apparatus comprising:

a data processing apparatus, the data processing apparatus being configured:

to calculate a transform for transforming points in a model of an object to an image of the object captured by a camera, the camera producing a two dimensional view of the object, the object having a plane, which includes a plurality of lines defining features on the plane of the object, to receive data representing the image view generated by the camera, to identify a plurality of triplets of points on the lines of the object in the image from the camera, each of the triplets providing three non co-linear points on the lines of the object in the plane of the object, to identify a sample triplet of points in the model, for each of the identified plurality of triplets, calculating a transform matrix which will transform the sample triplet of points from the model onto the identified plurality of triplets from the image view from the camera, for each of the identified transform matrices, to calculate a transformation of a plurality of points on the lines of the plane of the object from the model, to calculate a comparison metric between lines formed between the points transformed from the lines of the object in the model and corresponding lines between the points in the image view of the object, the comparison metric indicating a degree of similarity between the transformed triplet of points and the triplet of points in the image, and to identify a transform matrix which produces the best comparison metric, the identified transform matrix being for use in transforming points on the model into the image produced by the camera, or points in the image onto the model.

12. The image processing apparatus as claimed in claim 11, wherein the data processing apparatus is further configured to select a sample triplet of points from the lines in the plane of the object from the image view of the object, to form a test feature which includes the lines between the selected triplet of points, to expand the thickness of the lines of the test feature connecting each of the points of the triplet to a predetermined number of n-pixels, the test feature including pixels from the image so that the expanded test feature provides an expanded window view of pixels in the image connecting the sample triplet, to identify the corresponding triplet of points in the model, to transform the identified corresponding triplet of points using the identified transform matrix, which has the best comparison metric, to form a transformed feature from lines between the points of the transformed triplet of points, to calculate a comparison metric between the transformed feature from the model and the test feature, for a predetermined set of one or more adjustments, to adjust the position of the points of transformed triplet from the model and correspondingly the lines between the points, to re-calculate the comparison metric between the test feature and the adjusted transformed triplet, for each of the predetermined adjustments, and to identify a best comparison metric, for the adjustments, and for the adjustment with the best transform metric, to re-calculate the transform matrix to form a new best transform matrix.

13. The image processing apparatus as claimed in claim 12, wherein the data processing apparatus is further configured for each of a predetermined number of reductions in the thickness of the lines connecting each of the points of the test feature from n-pixels, for the predetermined set of adjustments, to adjust the position of the points of transformed triplet from the model and correspondingly the lines between the points, to re-calculate the comparison metric between the test feature and the adjusted transformed feature, for each of the predetermined adjustments, to identify a best comparison metric, for the adjustments, and for the adjustment with the best transform metric, to re-calculate the transform matrix to form the new best transform matrix.

14. An image processing apparatus comprising:

a data processing apparatus, the data processing apparatus being configured:

to introduce a graphical feature into an image view of an object from a video image of the object produced by a camera, the object having a plane, which includes a plurality of lines defining features on the plane of the object, the image processing apparatus comprising a data processor configured to form a model view of the object, to calculate a transform matrix for transforming points in the plane of the object into the image view of the object by identifying a plurality of triplets of points on the lines or edges of the object in the image from the camera, each of the triplets providing three or more non co-linear points on the lines of the object in the plane of the object, identifying a sample triplet of points in the model, for each of the identified plurality of triplets, calculating a transform matrix which will transform the sample triplet from the model onto the identified triplet from the camera image, for each of the identified transform matrices, calculating a transformation of a plurality of points on the lines of the object in the model, calculating a comparison metric between lines formed between the triplet of points transformed from the lines of the object in the model and corresponding lines between the triplet of points in the image view of the object, the comparison metric indicating a degree of similarity between the transformed triplet of points and the triplet of points in the image, and identifying the transform matrix which produces the best comparison metric, the identified transform matrix being for use in transforming points on the model into the image produced by the camera, or points in the image onto the model, and to form the graphical feature in the model of the object, and to transform the graphical feature from the model to the image view of the object using the transform matrix, and to represent the transformed graphical feature in the image view of the object.

15. A system comprising:

a camera configured to generate signals representative of an image providing a two dimensional view of an object, the object having a plane, which includes a plurality of lines defining features on the plane of the object, and an image processing apparatus configured to generate a transform matrix for transforming points within a model of the object into the image of the object as generated by the camera, the image processing apparatus comprising:

a data processor configured to form a model view of the object, to calculate a transform matrix for transforming points in the plane of the object into the image view of the object by identifying a plurality of triplets of points on the lines or edges of the object in the image from the camera, each of the triplets providing three or more non co-linear points on the lines of the object in the plane of the object, identifying a sample triplet of points in the model, for each of the identified plurality of triplets, calculating a transform matrix which will transform the sample triplet from the model onto the identified triplet from the camera image, for each of the identified transform matrices, calculating a transformation of a plurality of points on the lines of the object in the model, calculating a comparison metric between lines formed between the triplet of points transformed from the lines of the object in the model and corresponding lines between the triplet of points in the image view of the object, the comparison metric indicating a degree of similarity between the transformed triplet of points and the triplet of points in the image, and identifying the transform matrix which produces the best comparison metric, the identified transform matrix being for use in transforming points on the model into the image produced by the camera, or points in the image onto the model, and to form the graphical feature in the model of the object, and to transform the graphical feature from the model to the image view of the object using the transform matrix, and to represent the transformed graphical feature in the image view of the object.

16. The system as claimed in claim 15, wherein the image processing apparatus is operable to represent a graphical feature in the image view of the object.

17. The system as claimed in claim 15, further comprising:

a server operable to receive a signal from the image processing apparatus representative of the image of the object with a graphical feature represented therein and to stream data representing the image including the graphical feature to one or more client devices.

18. A non-transitory computer readable storage medium having stored thereon a computer program, which when executed by a data processor causes the data processor to perform a method, the method comprising:

calculating a transform matrix for transforming points in a model of an object to an image of the object captured by a camera, the image providing a two dimensional view of the object, the object having a plane, which includes a plurality of lines or edges defining features on the plane of the object, the calculating the transform matrix comprising:

identifying a plurality of triplets of points on the lines or edges of the object in the image from the camera, each of the triplets providing three or more non co-linear points on the lines of the object in the plane of the object, identifying a sample triplet of points in the model, for each of the identified plurality of triplets, calculating a transform matrix which will transform the sample triplet from the model onto the identified triplet from the camera image, for each of the identified transform matrices, calculating a transformation of a plurality of points on the lines of the object in the model, calculating a comparison metric between lines formed between the triplet of points transformed from the lines of the object in the model and corresponding lines between the triplet of points in the image view of the object, the comparison metric indicating a degree of similarity between the transformed triplet of points and the triplet of points in the image, and identifying the transform matrix which produces the best comparison metric, the identified transform matrix being for use in transforming points on the model into the image produced by the camera, or points in the image onto the model.

19. An apparatus for calculating a transform matrix for transforming points in a model of an object to an image of the object captured by a camera, the image providing a two dimensional view of the object, the object having a plane, which includes a plurality of lines or edges defining features on the plane of the object, the apparatus comprising:

means for identifying a plurality of triplets of points on the lines or edges of the object in the image from the camera, each of the triplets providing three or more non co-linear points on the lines of the object in the plane of the object, means for identifying a sample triplet of points in the model, for each of the identified plurality of triplets, means for calculating a transform matrix which will transform the sample triplet from the model onto the identified triplet from the camera image, for each of the identified transform matrices, means for calculating a transformation of a plurality of points on the lines of the object in the model, means for calculating a comparison metric between lines formed between the triplet of points transformed from the lines of the object in the model and corresponding lines between the triplet of points in the image view of the object, the comparison metric indicating a degree of similarity between the transformed triplet of points and the triplet of points in the image, and means for identifying the transform matrix which produces the best comparison metric, the identified transform matrix being for use in transforming points on the model into the image produced by the camera, or points in the image onto the model.

\* \* \* \* \*